(12) United States Patent
Son

(10) Patent No.: US 9,900,587 B2
(45) Date of Patent: Feb. 20, 2018

(54) IMAGE DISPLAY APPARATUS

(71) Applicant: LG DISPLAY CO., LTD., Seoul (KR)

(72) Inventor: Jung Eun Son, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 285 days.

(21) Appl. No.: 14/579,580

(22) Filed: Dec. 22, 2014

(65) Prior Publication Data

US 2016/0065954 A1 Mar. 3, 2016

(30) Foreign Application Priority Data

Sep. 3, 2014 (KR) ........................ 10-2014-0117290

(51) Int. Cl.
*H04N 13/04* (2006.01)
*G02B 27/22* (2006.01)

(52) U.S. Cl.
CPC ....... *H04N 13/0404* (2013.01); *G02B 27/225* (2013.01); *G02B 27/2214* (2013.01); *G02B 27/2278* (2013.01); *H04N 13/0409* (2013.01); *H04N 13/0418* (2013.01); *H04N 13/0475* (2013.01); *H04N 13/0477* (2013.01); *G09G 2320/028* (2013.01); *G09G 2320/068* (2013.01)

(58) Field of Classification Search
CPC .. G02B 27/22; G02B 27/2214; G02B 27/225; G02B 27/2271; G02B 27/2278; G09G 3/003; G09G 3/36; G09G 2320/028; G09G 2320/068; H04N 13/0418; H04N 13/0404

See application file for complete search history.

(56) References Cited

U.S. PATENT DOCUMENTS

| | | | |
|---|---|---|---|
| 2002/0118452 A1* | 8/2002 | Taniguchi | G02B 27/2214 359/463 |
| 2004/0150767 A1* | 8/2004 | Kim | H04N 13/0409 349/74 |
| 2008/0088753 A1* | 4/2008 | Chestak | G02B 27/225 349/15 |
| 2010/0201790 A1 | 8/2010 | Son et al. | |
| 2011/0228181 A1* | 9/2011 | Jeong | G02B 5/1842 349/15 |
| 2013/0009859 A1* | 1/2013 | Woo | G02B 27/2214 345/156 |
| 2013/0057790 A1* | 3/2013 | Xu | G02F 1/13306 349/15 |
| 2013/0135545 A1* | 5/2013 | Jung | G02F 1/13306 349/33 |
| 2013/0176299 A1 | 7/2013 | Hamagishi | |
| 2013/0342586 A1 | 12/2013 | Kim et al. | |

FOREIGN PATENT DOCUMENTS

| | | |
|---|---|---|
| CN | 101799584 A | 8/2010 |
| CN | 103200412 A | 7/2013 |
| CN | 103517053 A | 1/2014 |

* cited by examiner

*Primary Examiner* — David Tung
(74) *Attorney, Agent, or Firm* — Birch, Stewart, Kolasch & Birch, LLP

(57) ABSTRACT

An image display apparatus splits a barrier panel, which forms a plurality of light-transmitting areas and a plurality of light-blocking areas on each pixel, into a plurality of areas, and individually correcting locations of the light-transmitting areas and the light-blocking areas on the basis of viewing location information of a viewer with respect to a display panel, thereby realizing a stereoscopic image on an entire area of the display panel even if the viewing location of the viewer is varied.

14 Claims, 11 Drawing Sheets

: 3D AREA

IMAGE DISPLAY APPARATUS

CROSS REFERENCE TO RELATED APPLICATIONS

This application claims the priority benefit of the Korean Patent Application No. 10-2014-0117290 filed on Sep. 3, 2014, which is hereby incorporated by reference for all purposes as if fully set forth herein.

BACKGROUND OF THE INVENTION

Field of the Invention

The present invention relates to an image display apparatus, and more particularly, to an image display apparatus that displays a non-glasses type stereoscopic image.

Discussion of the Related Art

Recently, as realistic images are becoming more in demand, stereoscopic image display devices that display 3D (three-dimensional) images as well as 2D (two-dimensional) images are being developed.

2D-image display devices have been greatly advanced in terms of a quality of a display image such as resolution and viewing angle, but have a limitation in that 2D-image display devices cannot display depth information of an image because they are displaying 2D images.

On the other hand, a stereoscopic image display devices display stereoscopic images instead of 2D-planar images, and thus fully transfer original 3D information to a user. Therefore, in comparison with the existing 2D-image display devices, stereoscopic image display devices display far more vivid and realistic stereoscopic images.

Stereoscopic image display devices are largely categorized into glasses type stereoscopic image display devices using 3D glasses and non-glasses type stereoscopic image display devices using no 3D glasses. The non-glasses type stereoscopic image display devices are the same as the glasses type stereoscopic image display devices in the sense that the non-glasses type stereoscopic image display devices provide a three-dimensionality of an image to a viewer by using a binocular parallax. However, since the non-glasses type stereoscopic image display devices do not require wearing the 3D glasses, the non-glasses type stereoscopic image display devices are more advantageous than the glasses type stereoscopic image display devices. The non-glasses type stereoscopic image display devices may be categorized into a lenticular type and a barrier type, wherein the non-glasses type stereoscopic image display device of the lenticular type splits a left-eye image and a right-eye image from each other by using a cylindrical lens array, and the non-glasses type stereoscopic image display device of the barrier type splits a left-eye image and a right-eye image from each other by using a barrier.

FIG. 1 is a diagram illustrating a general barrier type stereoscopic image display apparatus.

Referring to FIG. 1, the general barrier type stereoscopic image display apparatus includes a display panel 10 displaying images by splitting a left-eye image L1 and a right-eye image RI from each other, and a barrier panel 20 formed to have light-transmitting areas 22 and light-blocking areas 24, which are repeatedly arranged, and arranged on an entire surface of the display panel 10.

A viewer views images displayed on the display panel 10 through the light-transmitting areas 22 of the barrier panel 20, wherein a left eye LE and a right eye RE of the viewer see different areas of the display panel 10 through the same light-transmitting area 22. Accordingly, the viewer views the left-eye image LI and the right-eye image RI, which are displayed to adjoin each other through the light-transmitting areas 22, thereby feeling three-dimensionality.

The stereoscopic image display apparatus described as above is advantageous in that switching of a 2D display mode or a 3D display mode may be performed in accordance with the status of the light-transmitting areas 22 and the light-blocking areas 24, which are formed on the barrier panel 20. The stereoscopic image display apparatus is recently applied to televisions, monitors, notebook computers, netbook computers, tablet computers, and mobile devices owing to the advantage.

However, in the general stereoscopic image display device, since the light-transmitting areas 22 and the light-blocking areas 24 are fixedly formed on the barrier panel 20, if a viewing location (or distance) of the viewer is varied, the location of the viewer is not matched with the light-transmitting areas 22 in some area of the display panel 10. For this reason, a problem occurs in that stereoscopic images are not realized in some area of the display panel 10.

SUMMARY OF THE INVENTION

Accordingly, the present invention is directed to an image display apparatus that substantially obviates one or more problems due to limitations and disadvantages of the related art.

An advantage of the present invention is to provide an image display apparatus that may realize stereoscopic images on an entire area of a display panel even if a viewing location of a viewer is varied.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an image display apparatus splits a barrier panel, which forms a plurality of light-transmitting areas and a plurality of light-blocking areas on each pixel, into a plurality of areas, and individually correcting locations of the light-transmitting areas and the light-blocking areas on the basis of viewing location information of a viewer with respect to a display panel, thereby realizing a stereoscopic image on an entire area of the display panel even if the viewing location of the viewer is varied.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Terms disclosed in this specification should be understood as follows.

The term of a singular expression should be understood to include a multiple expression as well as the singular expression if there is no specific definition in the context. The terms such as "the first" and "the second" are used only to differentiate one element from other elements. Thus, a scope of claims is not limited by these terms. Also, it should be understood that the term such as "include" or "have" does not preclude existence or possibility of one or more features, numbers, steps, operations, elements, parts or their combinations. It should be understood that the term "at least one" includes all combinations related with any one item. For example, "at least one among a first element, a second element and a third element" may include all combinations of two or more elements selected from the first, second and third elements as well as each element of the first, second and third elements. Also, if it is mentioned that a first element is positioned "on or above" a second element, it should be understood that the first and second elements may be brought into contact with each other, or a third element may be interposed between the first and second elements.

Hereinafter, an image display apparatus according to the preferred embodiment of the present invention will be described in detail with reference to the accompanying drawings. Wherever possible, the same reference numbers will be used throughout the drawings to refer to the same or like parts. Also, in the following description of the present invention, if detailed description of elements or functions known in respect of the present invention is determined to make the subject matter of the present invention unnecessarily obscure, the detailed description will be omitted.

Figure 1:
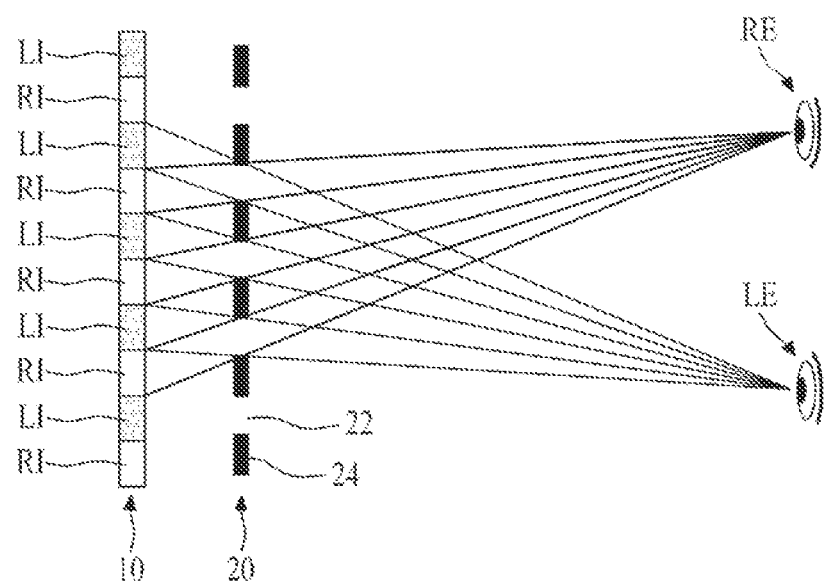
FIG. 1 is a diagram illustrating a general barrier type stereoscopic image display device.
Figure 2:
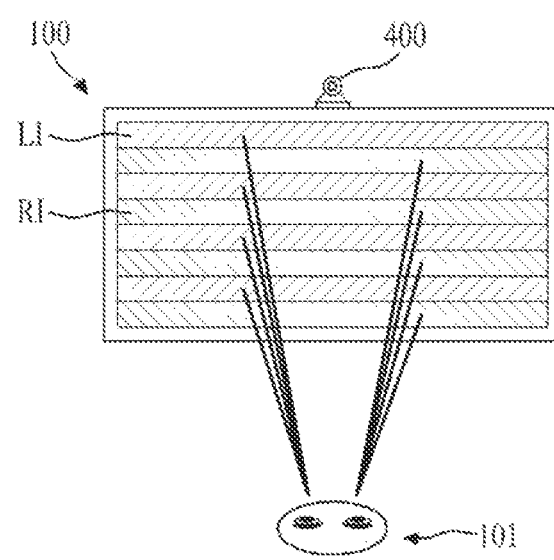
FIG. 2 is a diagram illustrating a driving method of stereoscopic images in an image display apparatus according to one embodiment of the present invention.
Figure 3:
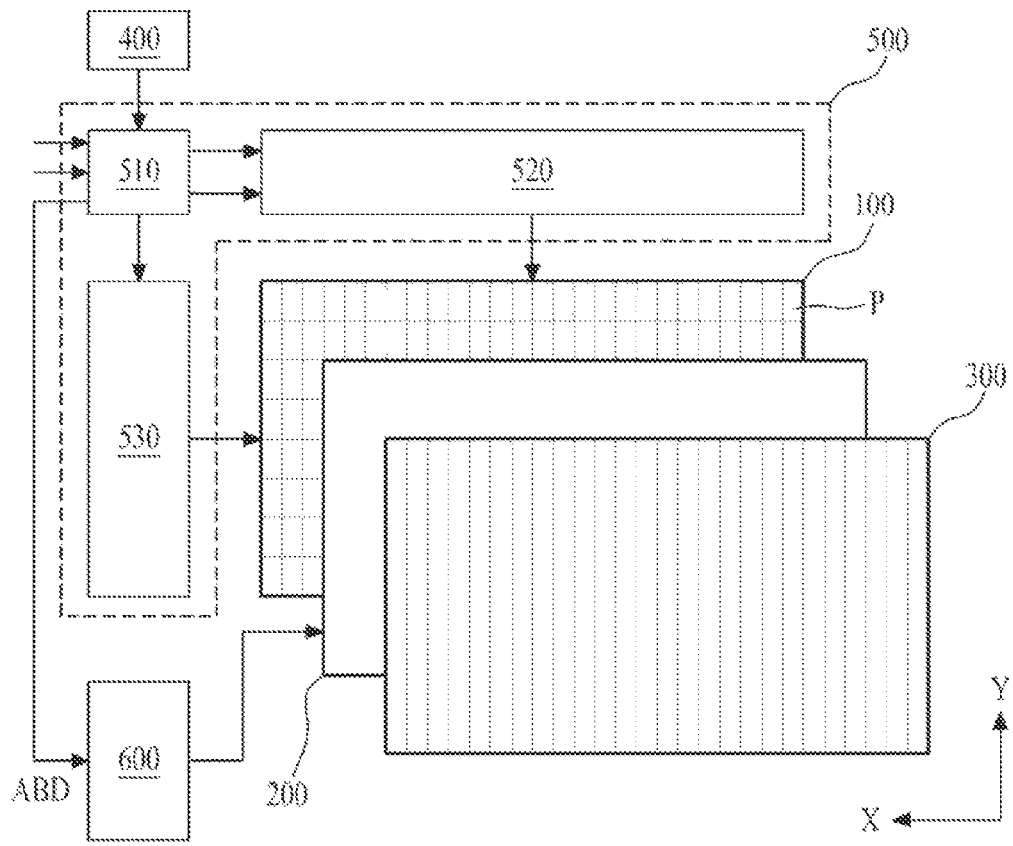
FIG. 3 is a diagram illustrating an image display apparatus according to one embodiment of the present invention.
Figure 4:
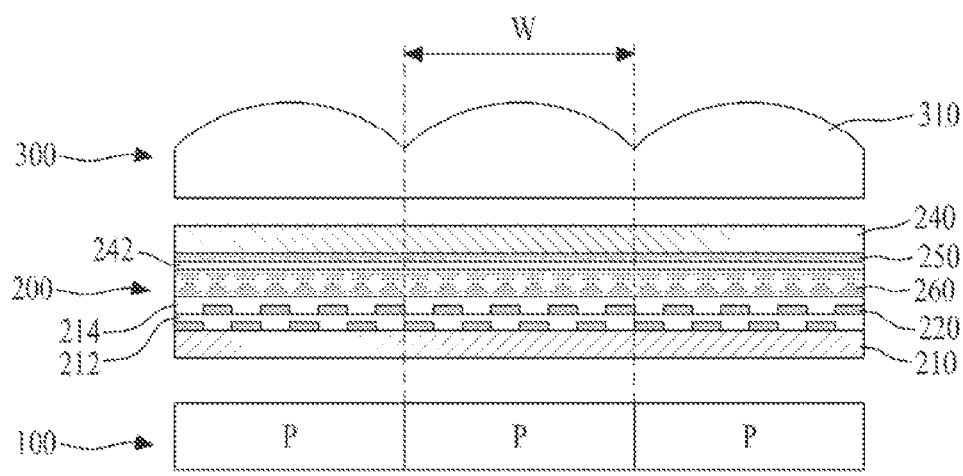
FIG. 4 is a cross-sectional diagram partially illustrating a display panel, a barrier panel and a lens array sheet, which are shown in FIG. 3.

FIG. 2 is a diagram illustrating a driving method of stereoscopic images in an image display apparatus according to one embodiment of the present invention, FIG. 3 is a diagram illustrating an image display apparatus according to one embodiment of the present invention, and FIG. 4 is a cross-sectional diagram partially illustrating a display panel, a barrier panel and a lens array sheet, which are shown in FIG. 3.

Referring to FIGS. 2 to 4, an image display apparatus according to one embodiment of the present invention includes a display panel 100, a barrier panel 200, a lens array sheet 300, a location detector 400, a display driver 500, and a barrier driver 600.

The display panel 100 includes a plurality of pixels P formed per pixel area defined by crossing between a plurality of data lines and a plurality of scan lines. At least three neighboring pixels P constitute one unit pixel, wherein each unit pixel may include a red pixel, a green pixel, and a blue pixel. The pixel P may include at least one thin film transistor and a pixel cell displaying images in response to a data signal supplied through the thin film transistor. In this case, the pixel cell may be a liquid crystal cell, a light-emitting cell, or an electrophoresis cell.

The display panel 100 displays a 2D image in accordance with a 2D mode, or displays a stereoscopic image by splitting a left-eye image LI and a right-eye image RI from each other in accordance with a 3D mode. The left-eye image LI and the right-eye image RI may be displayed alternately in a unit of a horizontal line of the display panel 100. For example, the left-eye image LI may be displayed in an odd numbered horizontal line of the display panel 100, and the right-eye image RI may be displayed in an even numbered horizontal line of the display panel 100.

The display panel 100 may be a flat display panel, for example, a liquid crystal display panel, a plasma display panel, an organic light-emitting display panel, or an electrophoresis display panel. At this time, if the flat display panel is a liquid crystal display panel, the image display apparatus of the present invention further includes a back light unit (not shown) that irradiates light towards the display panel 100.

Figure 5:
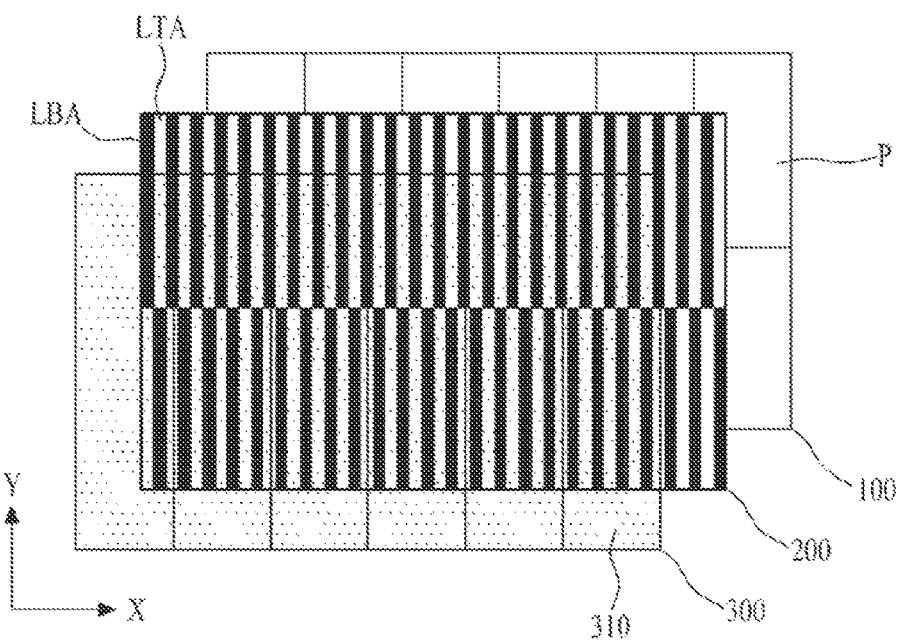
FIG. 5 is a diagram illustrating light-transmitting areas and light-blocking areas, which are formed on a barrier panel according to an embodiment of the present invention.
Figure 6:
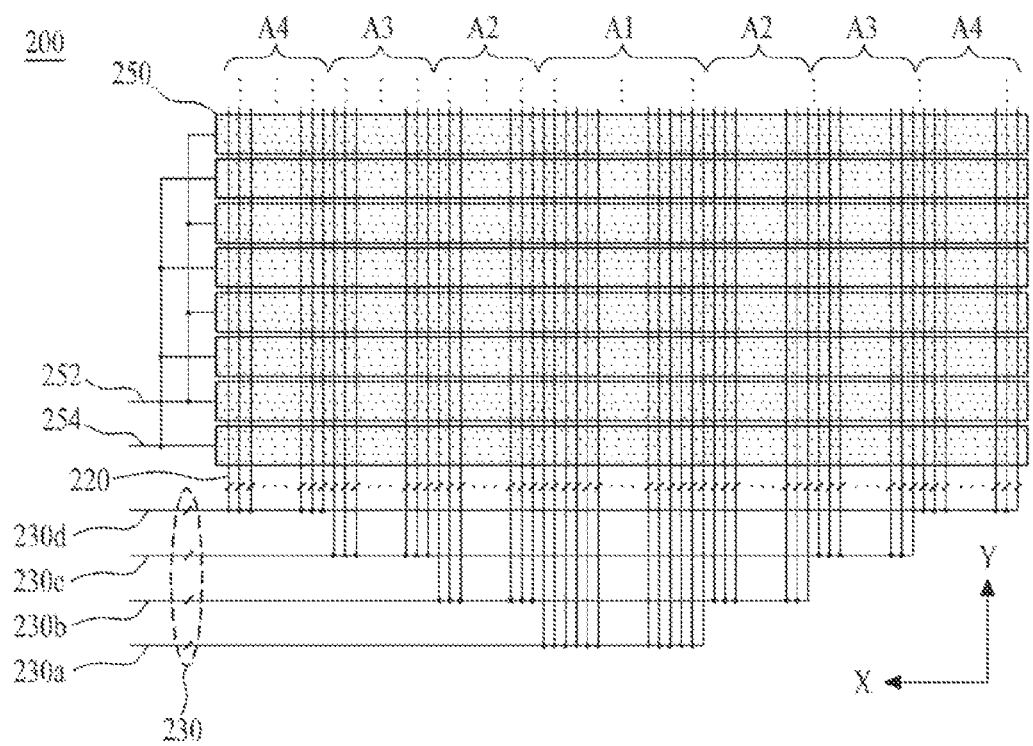
FIG. 6 is a diagram illustrating electrode lines and common lines of a barrier panel according to an embodiment of the present invention.

The barrier panel 200 is arranged above the display panel 100 as shown in FIGS. 4 to 6. The barrier panel 200 forms light-transmitting areas LTA on each pixel P during a 2D mode. On the other hand, the barrier panel 200 spatially splits a path of light that advances from the display panel 100 to a left eye and a right eye of a viewer by forming a plurality of light-transmitting areas LTA and a plurality of light-blocking areas LBA on each pixel during a 3D mode.

The barrier panel 200 according to one embodiment includes a first substrate 210, N number of electrode lines 220 (N is a natural number greater than 2), M number of signal supply line groups 230 (M is a natural number greater than 2), a second substrate 240, a plurality of common lines 250, and a liquid crystal layer 260.

The first substrate 210 is a glass substrate of a transparent material or a plastic substrate, and is arranged above the display panel 100.

The N number of electrode lines 220 per pixel are formed in parallel with one another to overlap each pixel P formed in the display panel 100, thereby splitting each pixel P into N sections in a first direction Y of the display panel 100. That is, the N number of electrode lines 220 per pixel form a plurality of light-transmitting areas LTA and a light-blocking areas LBA on the corresponding pixel P through driving signals (or driving voltages) which are addressed individually. In the following description, it is assumed that the N number of electrode lines 220 per pixel are 8 electrode lines to split the pixel into eight (8) sections.

The eight electrode lines 220 per pixel are formed on the first substrate 210 in parallel to be spaced apart from one another at constant intervals, and have a double layered structure that the respective electrode lines are arranged alternately in the form of zigzag with an insulating film 212 interposed therebetween. For example, the eight electrode lines 220 per pixel may be formed in a double layered structure with the insulating film 212 interposed between the respective electrode lines. In this case, four (hereinafter, referred to as "lower electrode lines") of the eight electrode lines 220 per pixel are formed on the first substrate, and the other four electrode lines (hereinafter, referred to as "upper electrode lines") are formed on the insulating film 212, which is formed on the first substrate 210 to cover the lower electrode lines, wherein the other four electrode lines are formed between the respective lower electrode lines.

Both sides of each lower electrode line are matched with both sides of each upper electrode line based on the first direction Y of the display panel 100. That is, if both sides of the lower electrode line are overlapped with both sides of the upper electrode line, light that transmits the overlap area between the lower electrode line and the upper electrode line becomes relatively smaller than light that transmits each of the lower electrode line and the upper electrode line, whereby un-uniformity of luminance may occur. Also, if both sides of the lower electrode line are spaced apart from both sides of the upper electrode line, light that transmits the spaced area of the upper electrode line and the upper electrode line becomes relatively more increased than light that transmits each of the lower electrode line and the upper electrode line, un-uniformity of luminance may occur. Accordingly, it is preferable that both sides of the lower electrode line are matched with both sides of the upper electrode line to improve uniformity of luminance. In this way, if the N number of electrode lines 220 per pixel are formed in a double layered structure, the light-transmitting areas LTA and the light-blocking areas LBA formed on each pixel may be controlled finely.

Meanwhile, since the barrier panel 200 has the N number of electrode lines 220 per pixel to split each pixel P into N sections, M*N number of electrode lines based on a multiplication value X*N of a total number X of the pixels P formed in the horizontal line of the display panel 100 and the number N of the electrode lines per pixel are formed on the barrier panel 200. If the electrode lines per pixel are driven individually, it is advantageous in that the light-transmitting areas LTA and the light-blocking areas LBA formed on the barrier panel 200 may be controlled per electrode line. However, it is impossible to connect the X*N number of electrode lines to the barrier driver 600. Accordingly, in the present invention, the N number of electrode lines 220 per pixel are grouped per area, and the electrode lines formed at the same location for each pixel are grouped to drive the N number of electrode lines 220 per pixel by using N number of signal supply lines per area, thereby reducing the number of the signal supply lines.

Each of the M number of signal supply line groups 230 is connected to the N number of electrode lines 220 included in each of M number of areas A1 to A4 defined in the barrier panel 200 (M is a natural number greater than 2). Hereinafter, it is assumed that the first to fourth areas A1 to A4 are defined in the barrier panel 200 and the M number of signal supply line groups 230 are first to fourth signal supply line groups 230a, 230b, 230c and 230d.

First of all, the first area A1 is overlapped with a center portion of the display panel 100, and includes a plurality of sub areas. The second area A2 may be defined at both sides of the first area A1 to adjoin the first area A1, the third area A3 may be defined at both sides of the second area A2 to adjoin the second area A2, and the fourth area A4 may be defined at both sides of the third area A3 to adjoin the third area A3. In this case, the fourth area A4 is overlapped with corner portions of both sides of the display panel 100. Each of the second to fourth areas A2 to A4 may be defined at the same size, and one sub area may be defined at the same size as that of each of the second to fourth areas A2 to A4.

Figure 7:
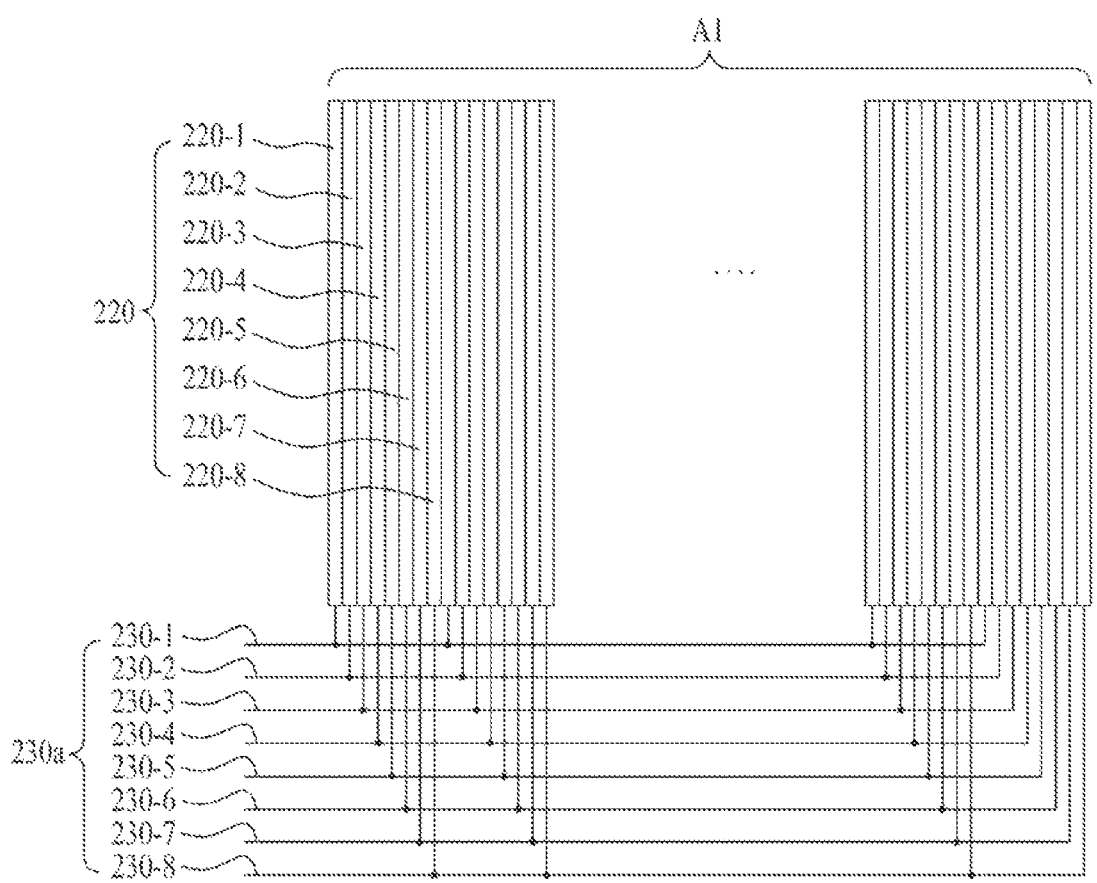
FIG. 7 is a diagram illustrating a connection structure of electrode lines per pixel and a first signal supply line group, which are included in a first area shown in FIG. 6.

Each of the first to fourth signal supply line groups 230a, 230b, 230c and 230d includes N number of signal supply lines, wherein the ith (i is 1 to N) signal supply line is commonly connected to the ith electrode line per pixel included in the corresponding areas A1 to A4. A connection structure between the N number of electrode lines 220 per pixel included in the first area A1 and the N number of signal supply lines of the first signal supply line group 230a will be described as follows with reference to FIG. 7.

The first signal supply line group 230a includes N number of signal supply lines, that is, eight signal supply lines, equally to the electrode lines per pixel. The first signal supply line 230-1 is commonly connected to the first electrode line 220-1 of each of the electrode lines 220 per pixel included in the first area A1, the second signal supply line 230-2 is commonly connected to the first electrode line 220-1 of each of the electrode lines 220 of per pixel, and the eighth signal supply line 230-8 is commonly connected to the eighth electrode line 220-8 of each of the electrode lines 220 per pixel included in the first area A1. Finally, at each of the first to fourth signal supply line groups 230a, 230b, 230c and 230d, the ith (i is 1 to N) signal supply line is commonly connected to the ith electrode line per pixel. As a result, if the barrier panel 200 is split into four areas A1 to A4 and includes eight electrode lines 220 per pixel, 32 signal supply lines are only required in the present invention.

Referring to FIGS. 4 to 6 again, the second substrate 240 is comprised of a glass substrate made of the same transparent material as that of the first substrate 210 or a plastic substrate. This second substrate 240 is bonded to the first substrate 210 to face each other by a sealant, which is formed at a corner portion, with the liquid crystal layer 260 interposed therebetween.

The plurality of common lines 250 are formed per pixel P along a second direction X crossing the first direction Y of the display panel 100, thereby crossing the N number of electrode lines 220 per pixel. The odd numbered common lines of the plurality of common lines 250 are commonly connected to the first common signal supply line 252, and receive a first common signal from the barrier driver 600 through the first common signal supply line 252. The even numbered common lines of the plurality of common lines 250 are commonly connected to the second common signal supply line 254, and receive a second common signal from the barrier driver 600 through the second common signal supply line 254. In this case, the first and second common signals may have their respective voltage levels different from each other such that the light-transmitting areas LTA and the light-blocking areas LBA are formed on each pixel P alternately along the second direction of the display panel 100 while alternating along the first direction Y of the display panel 100. For example, the first common signal may have a voltage level of 7V, and the second common signal may have a voltage level of 0V.

The liquid crystal layer 260 is formed between the first and second substrates 210 and 240, and may include a twisted nematic (TN) liquid crystal and a super twisted nematic (STN) liquid crystal. Arrangement of liquid crystal molecules of the liquid crystal layer 260 is varied in accordance with the driving signals applied to the electrode lines 220 and the common signals applied to the common lines 250, whereby the light-transmitting areas LTA and the light-blocking areas LBA are formed on each pixel P to transmit or block images.

The barrier panel 200 may further include a first alignment film 214 formed on the first substrate 210 to cover the N number of electrode lines 220 per pixel, and a second alignment film 242 formed on the second substrate 240 to cover the plurality of common lines 250. At this time, the first and second alignment films 214 and 242 are formed with the liquid crystal layer 260 interposed therebetween, thereby defining an initial arrangement state of the liquid crystal molecules of the liquid crystal layer 260.

Meanwhile, the barrier panel 200 may further include a polarizing film (not shown) attached to an upper surface (surface exposed to the outside) of the second substrate 240. The polarizing film serves to block light which is not fully blocked by the light-blocking areas LBA formed on the barrier panel 200. That is, the polarizing film allows only light transmitting the light-transmitting areas LTA of the barrier panel 200 to be emitted to the outside.

The lens array sheet 300 is arranged on the barrier panel 200, and includes a plurality of lenses 310 extended to overlap the plurality of pixels P formed along the first direction Y of the display panel 100 and arranged in the second direction X crossing the first direction Y.

The plurality of lenses 310 are formed in a convex semi-cylindrical shape. At this time, a pitch W of each of the plurality of lenses 310 is set equally to a width (or pitch) of one pixel P. Accordingly, horizontal resolution of the stereoscopic image realized by the lens array sheet 300 becomes equal to horizontal resolution of the display panel 100. In this case, since the left-eye image and the right-eye image are displayed alternately in a unit of a horizontal line, vertical resolution of the stereoscopic image realized by the lens array sheet 300 becomes a half of vertical resolution of the display panel 100.

Figure 8:
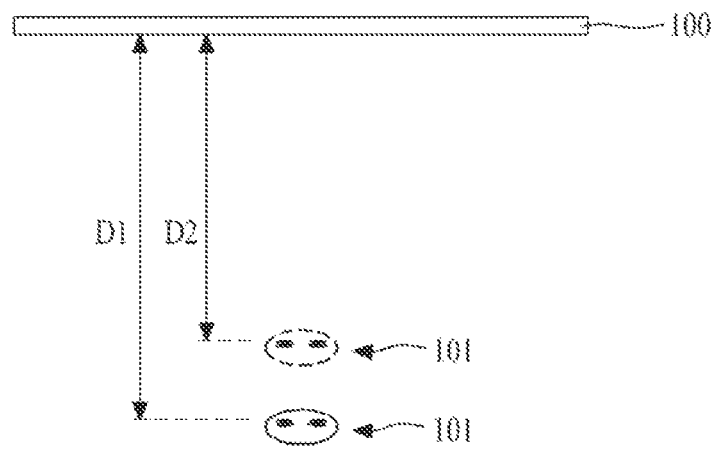
FIG. 8 is a diagram illustrating a viewing distance of a viewer with respect to a display panel in an embodiment of the present invention.

The location detector 400, as shown in FIG. 8, detects viewing location information of the viewer 100 who views the stereoscopic image displayed on the display panel 100, and provides the detected viewing location information to the display driver 500. For example, the location detector 400 detects viewing location information of the viewer 101 by detecting any one of eyes, eyeball, and eyebrow of the viewer 101 through a viewer tracking camera. In this case, the viewing location information of the viewer 101 may be distance information D1 and D2 between the center of the left eye and the right eye of the viewer 101 and the display panel 100. The location detector 400 may detect the viewing location information only if the driving mode of the image display apparatus is switched from the 2D mode to the 3D mode. However, the location detector 400 may detect the viewing location information in a unit of a predetermined period even for the 3D mode without limitation to the above example.

Additionally, the location detector 400 may take the viewer 101 through the viewer tracking camera, and may provide the taken image only to the display driver 500. In this case, the display driver 500 may detect the viewing location information of the viewer 101 by detecting any one of eyes, eyeball, and eyebrow of the viewer 101 from the taken image.

The display driver 500 displays the 2D image based on the 2D mode or the stereoscopic image based on the 3D mode by driving each pixel P of the display panel 100 on the basis of a mode signal, a digital image signal and a timing synchronization signal, which are input externally. The display driver 500 splits the barrier panel 200 into M number of areas A1 to A4, generates addressing barrier data ABD per area for correcting the locations of the light-transmitting areas LTA and the light-blocking areas LBA, which are formed on each pixel P, individually per M number of regions A1 to A4 on the basis of the viewing location information provided from the location detector 400, and provides the generated addressing barrier data ABD to the barrier driver 600. To this end, the display driver 500 according to one embodiment includes a timing controller 510, a data driver 520, and a scan driver 530.

The timing controller 510 generates image data per pixel by aligning the digital image signal to be suitable for a pixel arrangement structure of the display panel 100 on the basis of the digital image signal and the timing synchronization signal, which are input externally, during the 2D mode, and provides the generated image data to the data driver 520, and controls driving timing of each of the data driver 520 and the scan driver 530 on the basis of the timing synchronization signal. The timing controller 510 generates the addressing barrier data ABD per area and provides the generated addressing barrier data ABD to the barrier driver 600 such that the light-transmitting areas LTA are formed on the entire barrier panel 200 during the 2D mode.

The timing controller 510 generates left-eye image data and right-eye image data by aligning the digital image signal to be suitable for a stereoscopic image display mode of the display panel 100 on the basis of the digital image signal and the timing synchronization signal, which are input externally, during the 3D mode, and provides the generated left-eye image data and right-eye image data to the data driver 520, and controls driving timing of each of the data driver 520 and the scan driver 530 on the basis of the timing synchronization signal. The timing controller 510 generates addressing barrier data ABD per area for correcting the locations of the light-transmitting areas LTA and the light-blocking areas LBA, which are formed on each pixel P, individually per M number of areas A1 to A4 on the basis of the viewing location information of the viewer during the 3D mode and provides the generated addressing barrier data to the barrier driver 600.

For example, the timing controller 510 calculates distance information between the display panel 100 and the viewer 101 in accordance with the viewing location information during the 3D mode, and generates addressing barrier data ABD per area corresponding to the calculated distance information. At this time, the timing controller 510 may generate the addressing barrier data ABD per area corresponding to the calculated distance information by using a look-up table in which the locations of the light-transmitting areas LTA and the light-blocking areas LBA formed on each pixel are previously set per distance between the display panel 100 and the viewer 101.

Figure 9A:
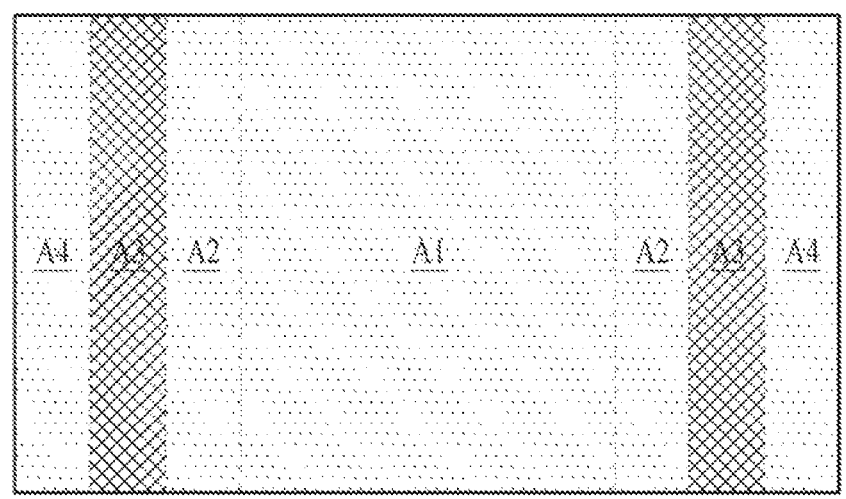
FIGS. 9A and 9B are diagrams illustrating location correction per area of light-transmitting areas and light-blocking areas based on a viewing distance of a viewer with respect to a display panel in an embodiment of the present invention.
Figure 9B:
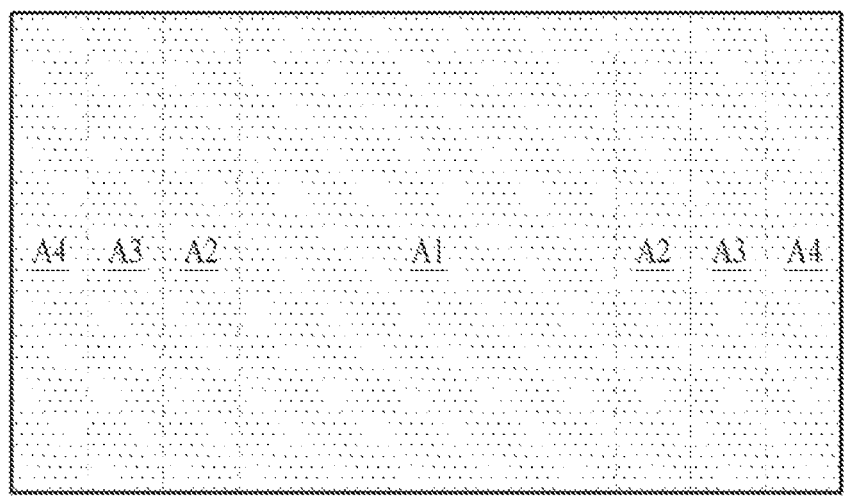
Figure 9B:

For another example, the timing controller 510, as shown in FIG. 9A, may detect a change of a viewing location of the viewer 101, which is realized in the display panel 100, select an area A3 (or 2D area) where the stereoscopic image is not realized as the location of the viewer is not matched with the light-transmitting areas LTA due to the changed viewing location, and generate addressing barrier data ABD per area for correcting the locations of the light-transmitting areas LTA and the light-blocking areas LBA formed on each pixel P of the selected area A3 to correspond to the changed viewing location, whereby the stereoscopic image may be realized in the selected area A3 as shown in FIG. 9B. Even in this case, the timing controller 510 may generate the addressing barrier data ABD of the selected area by using the look-up table.

The data driver 520 receives a data control signal and image data supplied from the timing controller 510, converts the image data to an analog type data signal in response to the data control signal, and supplies the converted data to the pixel P formed in each horizontal line of the display panel 100 every one horizontal period.

The scan driver 530 generates scan signals in response to a scan control signal supplied from the timing controller 510 and supplies the generated scan signals to a plurality of scan lines formed on the display panel 100 in due order. In this case, the scan driver 530 may be formed to be built in the display panel 100 in accordance with the manufacturing process of the thin film transistor of the pixel P.

Figure 10:
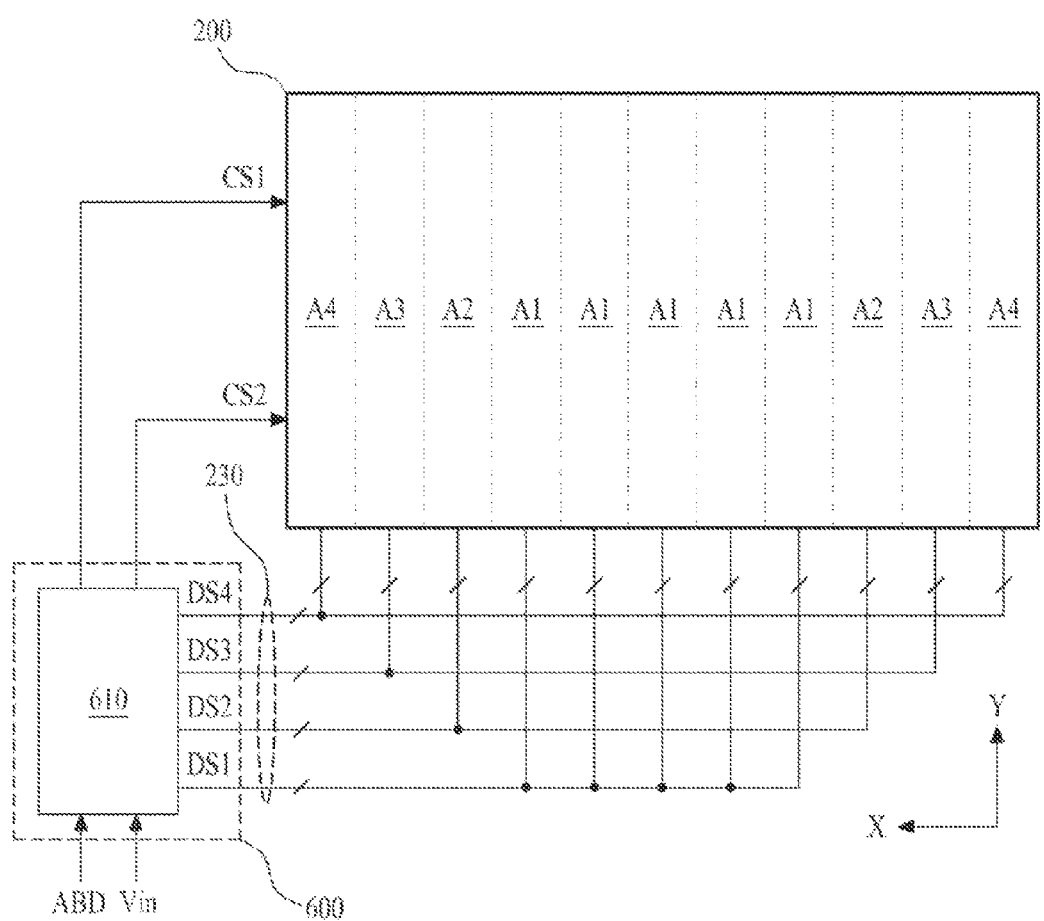
FIG. 10 is a diagram illustrating a barrier driver shown in FIG. 3.

The barrier driver 600 drives the barrier panel 200 by generating the driving signal per area and the first and second common signals on the basis of the addressing barrier data ABD per area provided from the display driver 500, that is, the timing controller 510. The barrier driver 600 according to one embodiment includes a signal supply unit 610 as shown in FIG. 10.

The signal supply unit 610 is individually connected to the N number of signal supply lines of each of the M number of signal supply line groups 230 formed on the display panel 200.

The signal supply unit 610 generates driving signals DS1 to DS4 per area and first and second common signals CS1 and CS2, which correspond to the addressing barrier data ABD per area provided from the timing controller 510, in accordance with the 2D mode by using an input power source Vin which is input externally, and applies the generated signals to the N number of electrode lines 220 (see FIG. 6) and the common lines 250 (see FIG. 6), thereby forming the light-transmitting areas LTA on the entire barrier panel 200. Also, the signal supply unit 610 generates driving signals DS1 to DS4 per area and first and second common signals CS1 and CS2, which correspond to the addressing barrier data ABD per area provided from the timing controller 510, in accordance with the 3D mode by using an input power source Vin which is input externally, and applies the generated signals to the N number of electrode lines 220 (see FIG. 6) and the common lines 250 (see FIG. 6), thereby forming a plurality of light-transmitting areas LTA and a plurality of light-blocking areas LBA on each pixel P of the display panel 100.

The signal supply unit 610 according to one embodiment may include a driving signal generator generating driving signals DS1 to DS4 per area, which will individually be supplied to each of the N number of electrode lines 220 per area, per area on the basis of each of the addressing barrier data ABD per area and supplying the generated driving signals to the corresponding signal supply line group 230, and a common signal generator generating a first common signal CS1 and supplying the generated first common signal to the first common signal supply line 252 and also generating a second common signal CS2 and supplying the generated second common signal to the second common signal supply line 254.

For example, the signal supply unit 610 applies different driving signals DS1 to DS4 to neighboring electrode lines 220 (see FIG. 6) along the second direction X of the display panel 100 on the basis of each of the addressing barrier data ABD per area based on the viewing location information indicating that the viewer is located at a proper viewing distance and also applies different common signals CS1 and CS2 to neighboring common lines 250 (see FIG. 6) along the first direction Y of the display panel 100. Accordingly, arrangement of the liquid crystal molecules of the liquid crystal layer 260 is varied by an electric field formed in accordance with the driving signals DS1 to DS4 and the common signals CS1 and CS2, whereby the light-transmitting areas LTA and the light-blocking areas LBA are formed on the barrier panel 200 in a mosaic pattern alternately along the second direction X while alternating along the first direction Y as shown in FIG. 5. Accordingly, in the present invention, the light-transmitting areas LTA and the light-blocking areas LBA may be formed in a mosaic pattern to completely split the left-eye image LI and the right-eye image RI from each other, thereby minimizing 3D crosstalk and thus improving display quality of the stereoscopic image. For example, if the first driving signal of 7V is supplied to the first electrode line 220, the second driving signal of 0V is supplied to the second electrode line 220 adjacent to the first electrode line 220, the first common signal of 7V is supplied to the odd numbered common line 250 crossing the first electrode line 220, and the second common signal of 0V is supplied to the even numbered common line 250 crossing the first electrode line 220, the light-transmitting area LTA is formed at the crossing portion between the first electrode line 220 and the odd numbered common line 250, the light-blocking area LBA is formed at the crossing portion between the first electrode line 220 and the even numbered common line 250, the light-blocking area LBA is formed at the crossing portion between the second electrode line 220 and the odd numbered common line 250, and the light-transmitting area LTA is formed at the crossing portion between the second electrode line 220 and the even numbered common line 250. As a result, the light-transmitting areas LTA and the light-blocking areas LBA are formed in a mosaic pattern.

For another example, the signal supply unit 610 supplies the driving signals DS1, DS2, DS3 and DS4 per area or the driving signals of the selected area to the electrode lines 220 per pixel of the corresponding area on the basis of each of the addressing barrier data ABD per area based on the viewing location information indicating that the viewer is not located at a proper viewing distance, and applies different common signals CS1 and CS2 to neighboring common lines 250 (see FIG. 6). Accordingly, the locations of the light-transmitting areas LTA and the light-blocking areas LBA per area formed on the barrier panel 200 are corrected to be matched with the viewing location of the viewer and also formed alternately along the first direction of the display panel 100, whereby the stereoscopic image is realized on the entire display panel 100. As a result, in the present invention, the left-eye image LI and the right-eye image RI may completely be split from each other even if the viewing location of the viewer is varied, whereby 3D crosstalk may be minimized and thus display quality of the stereoscopic image may be improved.

As described above, in the image display apparatus according to one embodiment of the present invention, the barrier panel 200 is split into M number of areas, and the locations of the light-transmitting areas LTA and the light-blocking areas LBA formed on each pixel are corrected individually per M number of areas on the basis of the viewing location information of the viewer 101 with respect to the display panel 100, whereby the stereoscopic image may be realized on the entire display panel 100 even if the viewing location of the viewer 101 is varied, and the number of the signal supply lines may be reduced by grouping of the N number of electrode lines 220 per pixel in a unit of area.

Figure 11:
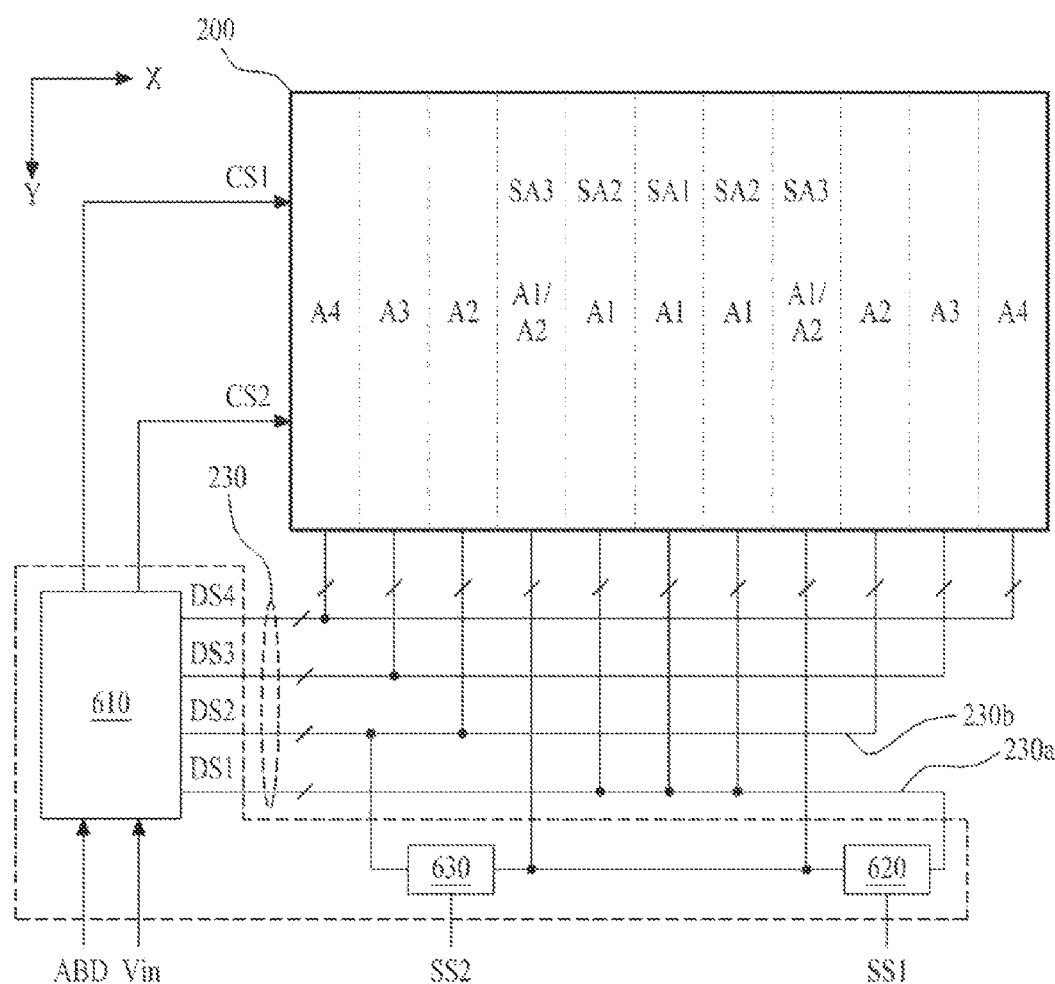
FIG. 11 is a diagram illustrating a modified example of a barrier driver in an image display apparatus according to one embodiment of the present invention.
Figure 12:
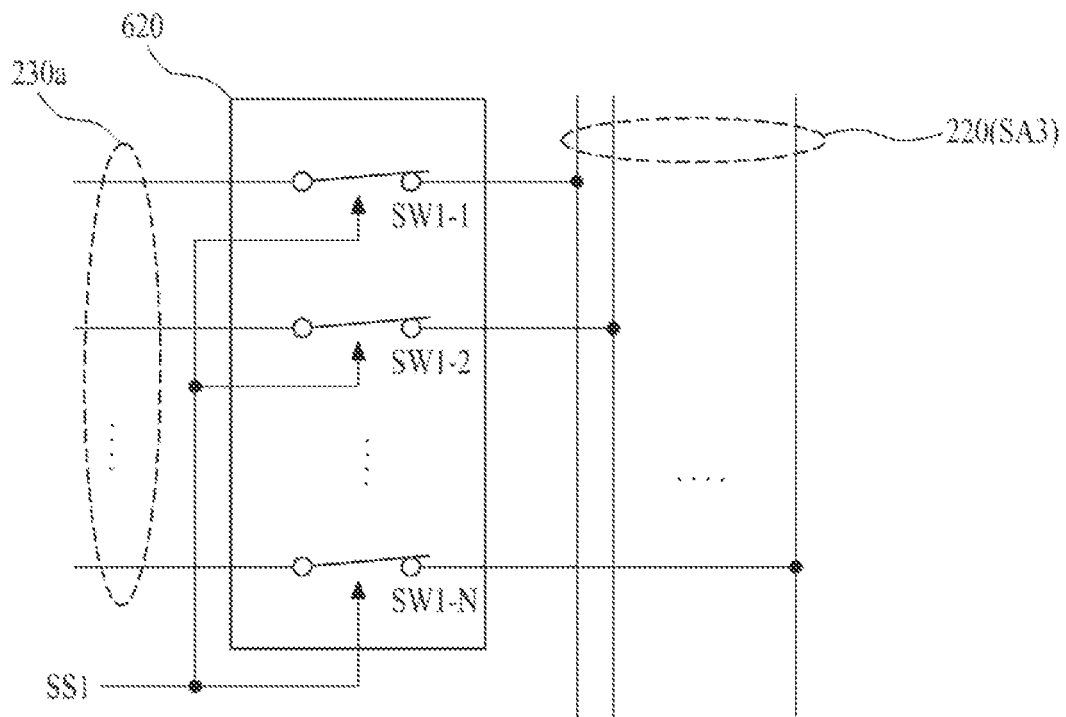
FIG. 12 is a diagram illustrating first and second switching units shown in FIG. 11.
Figure 12:
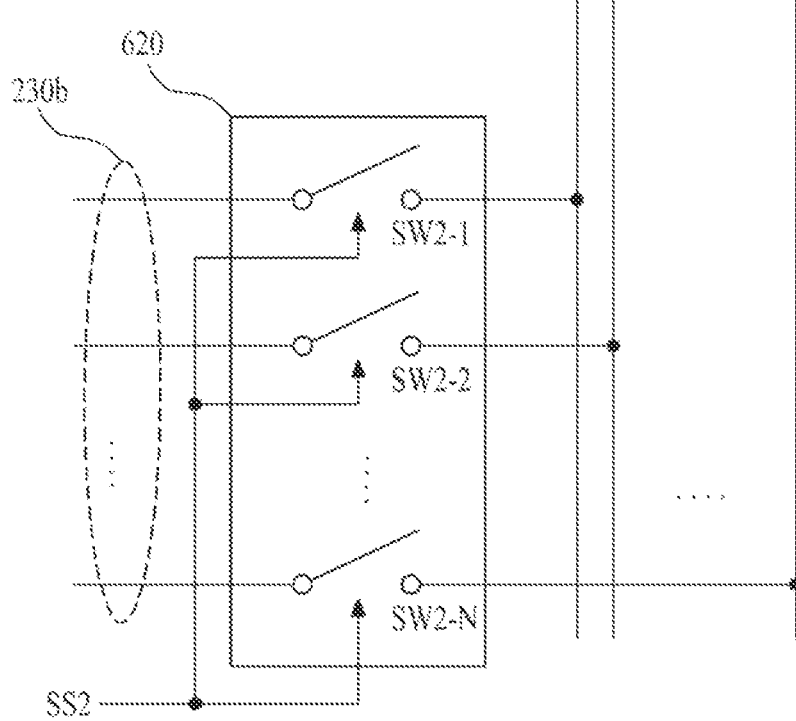

FIG. 11 is a diagram illustrating a modified example of a barrier driver in an image display apparatus according to one embodiment of the present invention, and FIG. 12 is a diagram illustrating first and second switching units shown in FIG. 11. Hereinafter, the barrier driver and its related elements will be described.

First of all, among the M number of areas defined in the barrier panel 200, the first area A1 overlapped with the center portion of the display panel 100 includes a plurality of sub areas. In the following description, it is assumed that the first area A1 includes a first sub area SA1 overlapped with the center portion of the display panel 100, a second sub area SA2 in contact with both sides of the first sub area SA1, and a third sub area SA3 in contact with both sides of the second sub area SA2.

The N number of electrode lines 220 (see FIG. 6) included in some sub areas SA1 and SA2 of the plurality of sub areas SA1, SA2 and SA3 are connected to the first signal supply line group 230a corresponding to the first area A1. And, the N number of electrode lines 220 included in the other sub area SA3 of the plurality of sub areas SA1, SA2 and SA3 may selectively be connected to the first signal supply line group 230a corresponding to the first area A1 or the second signal supply line group 230b corresponding to the second area A2.

The aforementioned display driver 500, that is, the timing controller 510, as shown in FIG. 8, varies the sizes of the first and second areas A1 and A2 on the basis of the viewing location information D1 and D2 of the viewer 101 with respect to the display panel 100 and additionally generates first and second switching signals SS1 and SS2 for connecting the N number of electrode lines per pixel included in each of the varied first and second areas A1 and A2 to the signal supply line group of the corresponding area. For example, if the viewing distance D1 and D2 of the viewer 101 is closer to the display panel 100 than a reference viewing distance D1, the timing controller 510 varies the sizes of the first and second areas A1 and A2 such that the first area A1 includes the first and second sub areas SA1 and SA2 and the second area includes the third sub area SA3, and generates the first and second switching signals SS1 and SS2 corresponding to each of the varied first and second areas A1 and A2. For another example, if the viewing distance D1 and D2 of the viewer 101 with respect to the display panel 100 is changed to the reference viewing distance D1, the timing controller 510 varies the sizes of the first and second areas A1 and A2 such that the first area A1 includes the first to third sub areas SA1, SA2 and SA3 and the second area A1 does not include the third sub area SA3, and generates the first and second switching signals SS1 and SS2 corresponding to each of the varied first and second areas A1 and A2.

The barrier driver 600 includes a signal supply unit 610, and first and second switching units 620 and 630. In this case, the signal supply unit 610 is the same as that shown in FIG. 10, and thus its repeated description will be omitted.

Figure 13A:
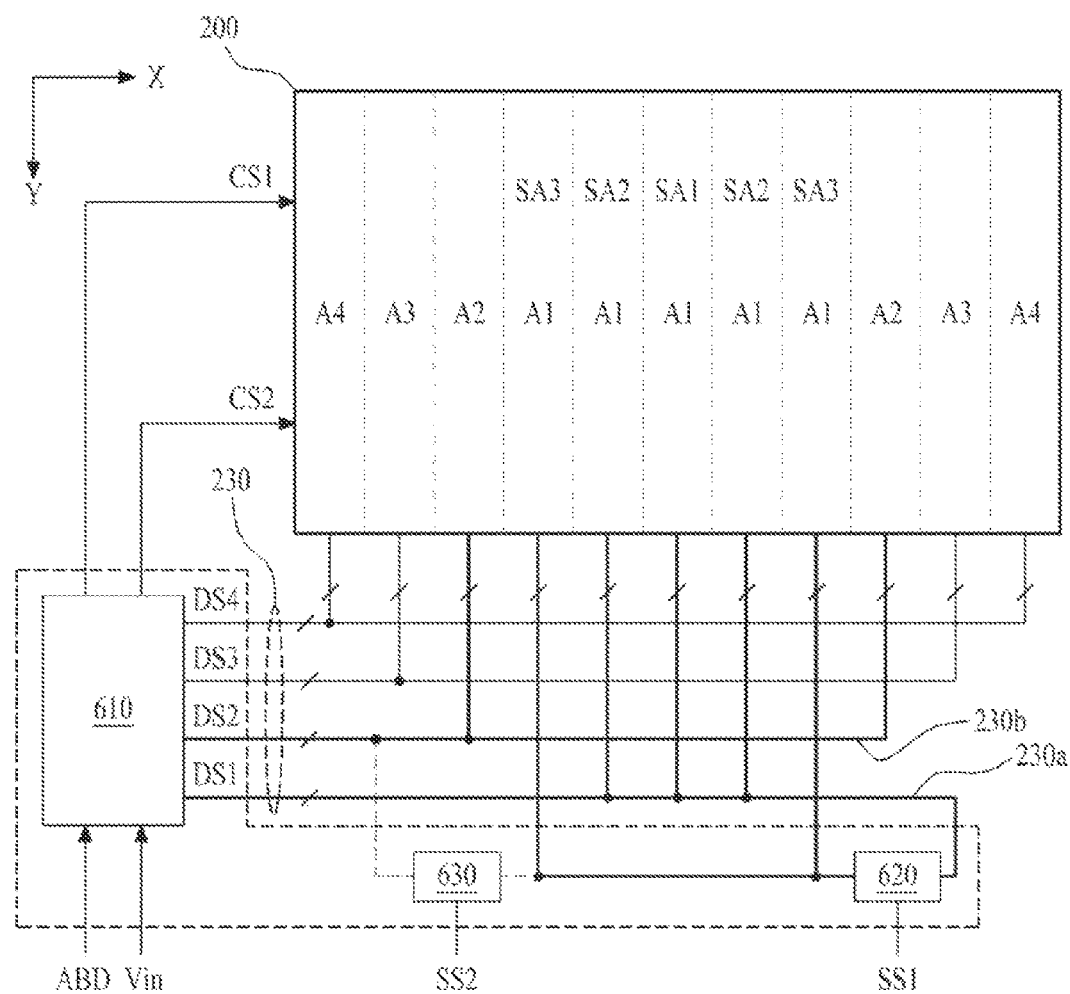
FIGS. 13A and 13B are diagrams illustrating variability of first and second areas based on a viewing distance of a viewer with respect to a display panel in the present invention.
Figure 13B:
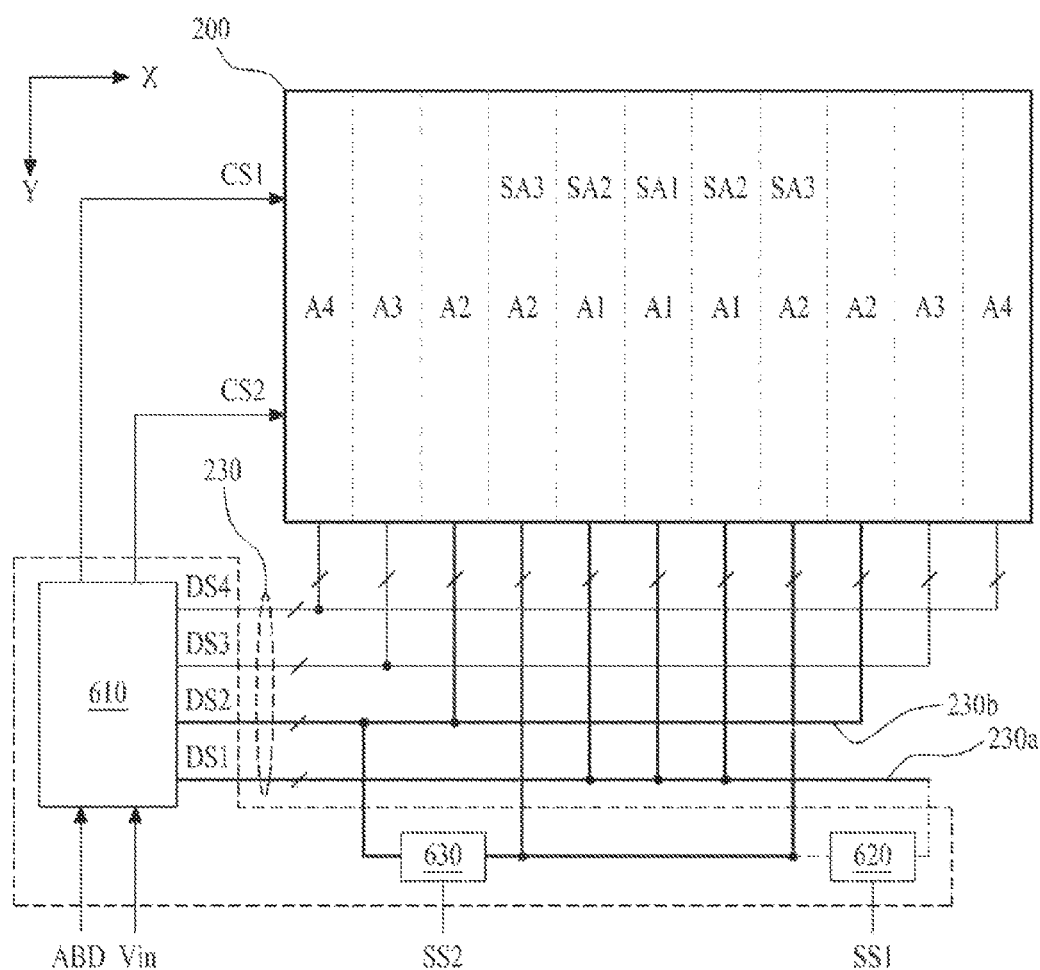

The first switching unit 620 selectively connects the N number of electrode lines 220 per pixel included in the third sub area SA3 to the first signal supply line group 230a corresponding to the first area A1. That is, the first switching unit 620, as shown in FIG. 13A, connects the N number of electrode lines 220 per pixel included in the third sub area SA3 to the first signal supply line group 230a in accordance with the first switching signal SS1 of a switch-on state, which is supplied from the timing controller 510. On the other hand, the first switching unit 620, as shown in FIG. 13B, does not connect the N number of electrode lines 220 per pixel included in the third sub area SA3 to the first signal supply line group 230a in accordance with the first switching signal SS1 of a switch-off state, which is supplied from the timing controller 510. As a result, the first switching unit 620 connects the N number of electrode lines 220 per pixel included in the third sub area SA3 to the first signal supply line group 230a only if the third sub area SA3 is included in the first area A1. To this end, the first switching unit 620 may include N number of first switching elements SW1-1 to SW1-N.

Each of the N number of first switching elements SW1-1 to SW1-N connects the N number of electrode lines 220 per pixel included in the third sub area SA3 to the first signal supply line group 230a corresponding to the first area A1 if the first switching signal SS1 of a switch-on state is supplied from the timing controller 510. Accordingly, the driving signal DS1 of the first area A1, which is supplied to the first signal supply line group 230a, is supplied to the N number of electrode lines 220 per pixel included in the third sub area SA3 through each of the N number of first switching elements SW1-1 to SW1-N. On the other hand, each of the N number of first switching elements SW1-1 to SW1-N does not connect the N number of electrode lines 220 per pixel included in the third sub area SA3 to the first signal supply line group 230a if the first switching signal SS1 of a switch-off state is supplied from the timing controller 510.

The second switching unit 630 selectively connects the N number of electrode lines 220 per pixel included in the third sub area SA3 to the second signal supply line group 230b corresponding to the second area A2. That is, the second switching unit 630, as shown in FIG. 13B, connects the N number of electrode lines 220 per pixel included in the third sub area SA3 to the second signal supply line group 230b in accordance with the second switching signal SS2 of a switch-on state, which is supplied from the timing controller 510. On the other hand, the second switching unit 630, as shown in FIG. 13A, does not connect the N number of electrode lines 220 per pixel included in the third sub area SA3 to the second signal supply line group 230b in accordance with the second switching signal SS2 of a switch-off state, which is supplied from the timing controller 510. As a result, the second switching unit 630 connects the N number of electrode lines 220 per pixel included in the third sub area SA3 to the second signal supply line group 230b only if the third sub area SA3 is included in the second area A2. To this end, the second switching unit 630 may include N number of second switching elements SW2-1 to SW2-N.

Each of the N number of second switching elements SW2-1 to SW2-N connects the N number of electrode lines 220 per pixel included in the third sub area SA3 to the second signal supply line group 230b corresponding to the second area A2 if the second switching signal SS2 of a switch-on state is supplied from the timing controller 510. Accordingly, the driving signal DS2 of the second area A2, which is supplied to the second signal supply line group 230*b*, is supplied to the N number of electrode lines 220 per pixel included in the third sub area SA3 through each of the N number of second switching elements SW2-1 to SW2-N. On the other hand, each of the N number of second switching elements SW2-1 to SW2-N does not connect the N number of electrode lines 220 per pixel included in the third sub area SA3 to the second signal supply line group 230*b* if the second switching signal SS2 of a switch-off state is supplied from the timing controller 510.

The aforementioned stereoscopic image display apparatus according to the present invention, which include the modified example of the barrier driver 600, may realize the stereoscopic image optimized for the viewing distance of the viewer 101 by varying the sizes of the first and second areas A1 and A2 on the basis of the viewing location information D1 and D2 of the viewer 101 with respect to the display panel 100.

Meanwhile, in the aforementioned present invention, although each of the second to fourth areas A2, A3 and A3 defined in the barrier panel 200 has a symmetric structure in a horizontal direction based on the first area A1, the structure of each of the second to fourth areas is not limited to the aforementioned description. For example, the barrier panel 200 may be split into first to seventh areas, wherein the second to fourth areas are arranged at one side of the first area A1, and the fifth to seventh areas may be arranged at the other side of the second area A2. Even in this case, the light-transmitting areas and the light-blocking areas may be formed individually in a unit of the first to seventh areas as described above, wherein the locations of the light-transmitting areas and the light-blocking areas may be corrected in accordance with the viewing location information of the viewer, whereby the stereoscopic image more optimized for the viewing location of the viewer may be realized.

As described above, the advantages according to one or more embodiments of the present invention may be obtained as follows.

One or more embodiments of the present invention may realize the stereoscopic image for the entire display panel even if the viewing location of the viewer is varied. Also, one or more embodiments of the present invention may reduce the number of signal supply lines for applying the driving signals to the electrode lines per pixel by grouping the electrode lines per pixel in a unit of areas.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An image display apparatus comprising:
a display panel that includes a plurality of pixels;
a barrier panel providing a plurality of light-transmitting areas and a plurality of light-blocking areas on each pixel, the barrier panel including N number of electrode lines per pixel arranged in a double layered structure to split each pixel into N sections,
a lens array sheet having a plurality of lenses extended to overlap the plurality of pixels, which are provided along a first direction of the display panel, and arranged in a second direction crossing the first direction;
a display driver splitting the barrier panel into M number of areas, and generating addressing barrier data per area for correcting locations of the light-transmitting areas and the light-blocking areas individually per the M number of areas on the basis of viewing location information of a viewer with respect to the display panel, wherein each of N and M is a natural number greater than 2; and
a barrier driver driving the barrier panel by generating driving signals per area on the basis of the addressing barrier data per area,
wherein the barrier panel further includes:
M number of signal supply line groups connected to the N number of electrode lines per pixel included in each of the M number of areas; and
a plurality of common lines provided per pixel along the second direction to cross the N number of electrode lines per pixel,
wherein each of the M number of signal supply line groups has N number of signal supply lines, where an ith signal supply line is commonly connected to the ith electrode line per pixel included in the corresponding area, wherein i is 1 to N,
wherein a first area of the M number of areas, which is overlapped with a center portion of the display panel, includes a plurality of sub areas,
N number of electrode lines per pixel included in some sub areas of the plurality of sub areas are connected to a signal supply line group corresponding to the first area, and
N number of electrode lines per pixel included in the other area of the plurality of sub areas are connected to a signal supply line group corresponding to the first area or a signal supply line group corresponding to a second area adjacent to the first area, and
wherein the display driver further generates first and second switching signals on the basis of the viewing location information of the viewer, and
the barrier driver includes:
a signal supply unit generating driving signals per area on the basis of the addressing barrier data per area and individually applying the generated driving signals to each of N number of signal supply lines of each of the M number of signal supply line groups;
a first switching unit connecting the N number of electrode lines per pixel included in the other sub area of the plurality of sub areas to the signal supply line group corresponding to the first area in accordance with the first switching signal; and
a second switching unit connecting the N number of electrode lines per pixel included in the other sub area of the plurality of sub areas to the signal supply line group corresponding to the second area in accordance with the second switching signal.

2. The image display apparatus of claim 1, wherein the N number of electrode lines per pixel are provided in a double layered structure, neighboring electrode lines being provided on their respective layers different from each other to alternate each other.

3. The image display apparatus of claim 1, wherein the barrier driver includes a signal supply unit connected to the N number of signal supply lines of each of the M number of signal supply line groups,
the signal supply unit generates driving signals, which will be supplied to each of the N number of electrode lines per the M number of areas, on the basis of the addressing barrier data per area and applies the generated signals to the corresponding signal supply line group and also applies different common signals to neighboring common lines along the first direction, and the light-transmitting areas and the light-blocking areas are alternately provided along the first direction.

4. The image display apparatus of claim 1, wherein the display driver selects an area corresponding to a location change of the viewer from the M number of areas on the basis of the viewing location information of the viewer, and generates the addressing barrier data per area for shifting the location of the light-transmitting areas provided in the selected area.

5. The image display apparatus of claim 1, wherein a pitch of each of the plurality of lenses is the same as that of each pixel.

6. The image display apparatus of claim 1, wherein:
the first area of the M number of areas is overlapped with the center portion of the display panel,
a second area of the M number of areas is adjacent to the first area, and
the barrier driver varies sizes of the first and second areas on the basis of the addressing barrier data per area.

7. The image display apparatus of claim 1, wherein the viewing location information of the viewer is distance information between a center of left and right eyes of the viewer and the display panel.

8. An image display apparatus comprising:
a display panel including a plurality of pixels;
a barrier panel having light-transmitting areas and light-blocking areas on each pixel, the barrier panel including N number of electrode lines per pixel arranged in a double layered structure to split each pixel into N sections,
a lens array sheet having a plurality of lenses extended to overlap the plurality of pixels;
a location detector configured to detect viewing location information of a viewer;
a display driver configured to split the barrier panel into M number of areas and generate addressing barrier data per area for correcting locations of the light-transmitting areas and the light-blocking areas individually per the M number of areas on the basis of the viewing location information of the viewer with respect to the display panel, wherein each of N and M is a natural number greater than 2; and
a barrier driver configured to drive the barrier panel by generating driving signals per area on the basis of the addressing barrier data per area generated by the display driver,
wherein the barrier panel includes:
M number of signal supply line groups connected to the N number of electrode lines per pixel included in each of the M number of areas, and
a plurality of common lines provided per pixel to cross the N number of electrode lines per pixel, and
wherein each of the M number of signal supply line groups has N number of signal supply lines, and an ith signal supply line is commonly connected to the ith electrode line per pixel included in the corresponding area, wherein i is 1 to N,
wherein:
a first area of the M number of areas which is overlapped with a center portion of the display panel includes a plurality of sub areas, the N number of electrode lines per pixel included in some sub areas of the plurality of sub areas are connected to a signal supply line group corresponding to a first area of the display panel, and
the N number of electrode lines per pixel included in the other area of the plurality of sub areas are connected to the signal supply line group corresponding to the first area or a signal supply line group corresponding to a second area adjacent to the first area,
wherein the display driver further generates first and second switching signals on the basis of the viewing location information of the viewer, and
wherein the barrier driver includes:
a signal supply unit generating driving signals per area on the basis of the addressing barrier data per area and individually applying the generated driving signals to each of N number of signal supply lines of each of the M number of signal supply line groups,
a first switching unit connecting the N number of electrode lines per pixel included in the other sub area of the plurality of sub areas to the signal supply line group corresponding to the first area in accordance with the first switching signal, and
a second switching unit connecting the N number of electrode lines per pixel included in the other sub area of the plurality of sub areas to the signal supply line group corresponding to the second area in accordance with the second switching signal.

9. The image display apparatus of claim 8, wherein the location detector detects the viewing location information of the viewer by detecting distance information between a center of left and right eyes of the viewer and the display panel.

10. The image display apparatus of claim 8, wherein:
the first area of the M number of areas is overlapped with the center portion of the display panel,
a second area of the M number of areas is adjacent to the first area, and
the barrier driver varies sizes of the first and second areas on the basis of the addressing barrier data per area.

11. The image display apparatus of claim 8, wherein a pitch of each of the plurality of lenses is the same as that of each pixel.

12. The image display apparatus of claim 8, wherein the N number of electrode lines per pixel are provided in the double layered structure, neighboring electrode lines being provided on different respective layers to alternate with each other.

13. The image display apparatus of claim 8, wherein:
the barrier driver includes a signal supply unit connected to the N number of signal supply lines of each of the M number of signal supply line groups,
the signal supply unit generates driving signals that are supplied to each of the N number of electrode lines per the M number of areas on the basis of the addressing barrier data per area, applies the generated signals to the corresponding signal supply line group, and applies different common signals to neighboring common lines along a first direction of the display panel, and
the light-transmitting areas and the light-blocking areas are alternately provided along the first direction.

14. The image display apparatus of claim 8, wherein the display driver selects an area corresponding to a location change of the viewer from the M number of areas on the basis of the viewing location information of the viewer, and generates the addressing barrier data per area for shifting the location of the light-transmitting areas provided in the selected area.

* * * * *